United States Patent
Takagi et al.

(10) Patent No.: US 12,544,720 B2
(45) Date of Patent: Feb. 10, 2026

(54) METHOD FOR PRODUCING GAS SEPARATION MEMBRANE, AND GAS SEPARATION MEMBRANE

(71) Applicants: TAKAGI Co., Ltd., Kitakyushu (JP); Shinshu University, Matsumoto (JP)

(72) Inventors: Toshio Takagi, Kitakyushu (JP); Yasushi Shimizu, Kitakyushu (JP); Katsuyuki Murata, Kitakyushu (JP); Katsumi Kaneko, Nagano (JP); Radovan Kukobat, Nagano (JP)

(73) Assignees: TAKAGI Co., Ltd., Kitakyushu (JP); Shinshu University, Matsumoto (JP)

( * ) Notice: Subject to any disclaimer, the term of this patent is extended or adjusted under 35 U.S.C. 154(b) by 709 days.

(21) Appl. No.: 17/759,525

(22) PCT Filed: Jan. 25, 2021

(86) PCT No.: PCT/JP2021/002492
§ 371 (c)(1),
(2) Date: Jul. 27, 2022

(87) PCT Pub. No.: WO2021/153515
PCT Pub. Date: Aug. 5, 2021

(65) Prior Publication Data
US 2023/0098985 A1 Mar. 30, 2023

(30) Foreign Application Priority Data
Jan. 29, 2020 (JP) .................................. 2020-012651

(51) Int. Cl.
*B01D 53/22* (2006.01)
*B01D 67/00* (2006.01)
(Continued)

(52) U.S. Cl.
CPC ....... *B01D 67/0055* (2013.01); *B01D 53/228* (2013.01); *B01D 67/0083* (2013.01);
(Continued)

(58) Field of Classification Search
CPC ............ B01D 67/0055; B01D 71/0281; B01D 71/0211; B01D 53/228; B01D 67/0083;
(Continued)

(56) References Cited

U.S. PATENT DOCUMENTS 11,278,849 B2 * 3/2022 Kaneko ................ B01D 67/006
2010/0178592 A1 * 7/2010 Cinquin ............... B01D 69/144
429/512
(Continued)

FOREIGN PATENT DOCUMENTS

| CN | 101497003 A | 8/2009 |
|---|---|---|
| CN | 101791520 A | 8/2010 |

(Continued)

OTHER PUBLICATIONS

International Preliminary Report on Patentability issued by The International Bureau of WIPO for International Application No. PCT/JP2021/002492 dated Aug. 11, 2022. (5 pages).
(Continued)

*Primary Examiner* — Anthony R Shumate
(74) *Attorney, Agent, or Firm* — Studebaker Brackett PLLC

(57) ABSTRACT

A method for producing a gas separation membrane includes a step of leaving a dispersion liquid to stand still, the dispersion liquid being obtained by mixing zeolite microcrystalline bodies formed from MFI zeolite and graphene oxide with pure water, and covering the periphery of the zeolite microcrystalline bodies with the graphene oxide; a step of drying the dispersion liquid after being left to stand to obtain a powder; a step of subjecting the powder to a
(Continued)

reduction treatment of the graphene oxide by means of heating; and a step of pressure-forming the powder after the reduction treatment so as to be formed into a membrane form.

4 Claims, 13 Drawing Sheets

(51) Int. Cl.
  *B01D 69/02* (2006.01)
  *B01D 69/10* (2006.01)
  *B01D 71/02* (2006.01)
(52) U.S. Cl.
  CPC ............ *B01D 69/02* (2013.01); *B01D 69/10* (2013.01); *B01D 71/02* (2013.01); *B01D 71/0211* (2022.08); *B01D 71/0281* (2022.08); *B01D 2323/081* (2022.08); *B01D 2323/10* (2013.01); *B01D 2323/21819* (2022.08); *B01D 2325/02831* (2022.08); *B01D 2325/04* (2013.01)
(58) Field of Classification Search
  CPC ........ B01D 69/02; B01D 69/10; B01D 71/02; B01D 2323/081; B01D 2323/21819; B01D 2325/02831; B01D 2323/10; B01D 2325/04
  See application file for complete search history.

(56) References Cited

U.S. PATENT DOCUMENTS

| | | | |
|---|---|---|---|
| 2015/0053607 A1* | 2/2015 | Liu | B01D 71/0211 210/500.39 |
| 2015/0266739 A1* | 9/2015 | Zhamu | C01B 32/182 428/408 |
| 2016/0038885 A1 | 2/2016 | Hogen-Esch et al. | |
| 2016/0141900 A1* | 5/2016 | Voller | H02J 7/342 320/114 |
| 2017/0155265 A1* | 6/2017 | Voller | H01G 11/62 |
| 2020/0002505 A1* | 1/2020 | Zhamu | C08G 73/1071 |
| 2020/0002506 A1* | 1/2020 | Zhamu | C09B 68/443 |
| 2020/0114307 A1* | 4/2020 | Tanaka | C01C 1/12 |
| 2020/0339423 A1* | 10/2020 | Lin | H05K 7/20336 |
| 2021/0125741 A1* | 4/2021 | Hsiao | C01B 32/182 |
| 2022/0322505 A1* | 10/2022 | Andreeva-Baeumler | H05B 3/145 |
| 2023/0374275 A1* | 11/2023 | Tang | C08L 1/02 |

FOREIGN PATENT DOCUMENTS

| | | |
|---|---|---|
| CN | 103212304 A | 7/2013 |
| CN | 103272487 A | 9/2013 |
| CN | 106178972 A | 12/2016 |
| CN | 108568218 A | 9/2018 |
| CN | 108636138 A | 10/2018 |
| CN | 109351208 A | 2/2019 |
| CN | 109860577 A | 6/2019 |
| CN | 110496609 A | 11/2019 |
| JP | H08-71385 A | 3/1996 |
| JP | 2003-210950 A | 7/2003 |
| JP | 2016-174996 A | 10/2016 |
| JP | 2018-115010 A | 7/2018 |
| JP | 2018-192378 A | 12/2018 |
| TW | 201940220 A | 10/2019 |
| WO | WO 2019/013059 A1 | 1/2019 |

OTHER PUBLICATIONS

Supplementary European Search Report for counterpart European Patent Application No. 21748028.4, dated Oct. 22, 2024; 13 pages.
Nezhad et al., "Experimental and theoretical exploration of gas permeation mechanism through 2D graphene (not graphene oxides) membranes", Journal of Membrane Science, Elsevier BV, NL, vol. 601, Jan. 27, 2020; 8 pages.
Supplemental Partial European Search Report for counterpart European Patent Application No. 21748028, dated Jan. 31, 2024; 12 pages.
International Search Report and Written Opinion of the International Searching Authority issued by the Japanese Patent Office for International Application No. PCT/JP2021/002492 dated Mar. 23, 2021. (6 pages).
English Translation of International Search Report of the International Searching Authority issued by the Japanese Patent Office for International Application No. PCT/JP2021/002492 dated Mar. 23, 2021. (2 pages).

* cited by examiner (a)

(b)

METHOD FOR PRODUCING GAS SEPARATION MEMBRANE, AND GAS SEPARATION MEMBRANE

CROSS REFERENCE TO RELATED APPLICATIONS

This application is a U.S. National Stage patent application of International Patent Application No. PCT/JP2021/002492, filed Jan. 25, 2021, which claims priority to Japanese Patent Application No. 2020-012651, filed Jan. 29, 2020, entitled "Method For Producing Gas Separation Membrane, And Gas Separation Membrane," the disclosures of which are hereby incorporated by reference in their entireties.

TECHNICAL FIELD

The present invention relates to a method for producing a gas separation membrane, and a gas separation membrane.

BACKGROUND ART

As a method for producing a zeolite membrane using zeolite microcrystals, Patent Literature 1 describes a method of precipitating a zeolite membrane on a porous support of alumina or the like, by a hydrothermal synthesis method or a vapor phase method using silica and alumina as starting materials. Furthermore, Patent Literature 2 describes a method of forming a zeolite membrane on a support by using zeolite microcrystals as seed crystals.

CITATION LIST

Patent Literature

Patent Literature 1: Japanese Unexamined Patent Publication No. 2003-210950
Patent Literature 2: Japanese Unexamined Patent Publication No. 2016-174996

SUMMARY OF INVENTION

Technical Problem

The present disclosure was achieved in view of the above-described circumstances, and it is an object of the present disclosure to provide a method for producing a gas separation membrane that can enhance gas separation performance, and a gas separation membrane.

Solution to Problem

In order to achieve the above-described object, a method for producing a gas separation membrane according to an embodiment of the present disclosure includes a step of leaving a dispersion liquid to stand still, the dispersion liquid being obtained by mixing zeolite microcrystalline bodies formed from MFI zeolite and graphene oxide with pure water, and covering the periphery of the zeolite microcrystalline bodies with the graphene oxide; a step of drying the dispersion liquid after being left to stand to obtain a powder; a step of subjecting the powder to a reduction treatment of the graphene oxide by means of heating; and a step of pressure-forming the powder after the reduction treatment so as to be formed into a membrane form.

According to the above-described method for producing a gas separation membrane, a dispersion liquid including zeolite microcrystalline bodies and graphene oxide is left to stand, the periphery of the zeolite microcrystalline bodies is covered with graphene oxide and then powderized, and the graphene oxide is reduced by a reduction treatment. Then, the powder after the reduction treatment is subjected to pressure-forming to be formed into a membrane form, and thereby a gas separation membrane is obtained. When a gas separation membrane is produced by such a method, a gas separation membrane in which the spaces between adjacent zeolite microcrystalline bodies are appropriately filled with graphene, and therefore, the gas separation performance can be enhanced.

Here, an embodiment further having, after the step of performing the reduction treatment of the graphene oxide and before the step of forming the membrane form, a step of performing a heating treatment at a temperature higher than the heating temperature for the reduction treatment and forming nanowindows in the graphene after being reduced, can be adopted.

By having a step of forming nanowindows in graphene before the step of forming a membrane form, nanowindows are provided in the graphene covering the periphery of the zeolite microcrystalline bodies. As a result, since the selectivity for gases based on the molecular size in particular can be increased, the separation performance can be further enhanced.

An embodiment in which the dispersion liquid is left to stand still in a state of being adjusted by a pH adjusting agent to a pH in the range of 3.6 to 11.0, can be adopted. As described above, the amount of graphene oxide coating the periphery of the zeolite microcrystalline bodies by graphene oxide can be increased by adjusting the pH of the dispersion liquid by means of a pH adjusting agent.

An embodiment in which the pH adjusting agent is ammonium chloride, and the pH of the dispersion liquid is adjusted to the range of 3.6 to 4.0 by means of the pH adjusting agent, can be adopted.

There is provided a gas separation membrane in a sheet form, in which the surface of a plurality of zeolite microcrystalline bodies formed from MFI zeolite is coated with graphene, while the zeolite microcrystalline bodies are bonded to each other by means of the graphene, and the spaces between adjacent zeolite microcrystalline bodies are filled with the graphene by pressure-forming the zeolite microcrystalline bodies having the surface coated with the graphene.

In the above-described gas separation membrane, zeolite microcrystalline bodies coated with graphene form a membrane in which the spaces between adjacent zeolite microcrystalline bodies are filled with graphene by pressure-forming. In the gas separation membrane, since the spaces between adjacent zeolite microcrystalline bodies are appropriately filled with graphene, the gas separation performance can be enhanced.

An embodiment in which the graphene has nanowindows can be adopted. As nanowindows are formed in graphene, the selectivity for gases based on the molecular size in particular can be increased, and therefore, the separation performance can be further enhanced.

Furthermore, a method for producing a gas separation membrane according to another embodiment of the present disclosure includes a step of leaving a dispersion liquid to stand still, the dispersion liquid being obtained by mixing apatite microcrystalline bodies formed from hydroxyapatite and graphene oxide with pure water, and covering the periphery of the apatite microcrystalline bodies with the graphene oxide; a step of drying the dispersion liquid after being left to stand to obtain a powder; a step of subjecting the powder to a reduction treatment of the graphene oxide by means of heating; and a step of pressure-forming the powder after the reduction treatment so as to be formed into a membrane form.

According to the above-described method for producing a gas separation membrane, a dispersion liquid including apatite microcrystalline bodies and graphene oxide is left to stand, the periphery of the apatite microcrystalline bodies is covered with graphene oxide, subsequently the dispersion liquid is powderized, and graphene oxide is reduced by a reduction treatment. Then, the powder after the reduction treatment is pressure-formed to be formed into a membrane form, and a gas separation membrane is obtained. By producing a gas separation membrane by such a method, a gas separation membrane in which the spaces between adjacent apatite microcrystalline bodies are appropriately filled with graphene is obtained, and therefore, the gas separation performance can be enhanced.

Here, after the step of performing the reduction treatment of the graphene oxide and before the step of forming into a membrane form, an embodiment further having a step of performing a heating treatment at a temperature higher than the heating temperature for the reduction treatment and forming nanowindows in the graphene after reduction, can be adopted.

By having a step of forming nanowindows in graphene before the step of forming into a membrane form, nanowindows are provided in the graphene that covers the periphery of the apatite microcrystalline bodies. As a result, the selectivity for gases particularly based on the molecular size can be increased, and therefore, the separation performance can be further enhanced.

An embodiment in which the dispersion liquid is left to stand still in a state of being adjusted by a pH adjusting agent to a pH in the range of 3.6 to 11.0, can be adopted. As described above, the amount of graphene oxide covering the periphery of apatite microcrystalline bodies can be increased by adjusting the pH of the dispersion liquid by means of a pH adjusting agent.

An embodiment in which the pH adjusting agent is ammonium chloride, and the pH of the dispersion liquid is adjusted to the range of 6.0 to 9.3 by means of the above-described pH adjusting agent, can be adopted.

There is provided a gas separation membrane in a sheet form, in which the surface of a plurality of apatite microcrystalline bodies formed from hydroxyapatite is coated with graphene, and at the same time, the apatite microcrystalline bodies are bonded to each other by means of the graphene, wherein the spaces between adjacent apatite microcrystalline bodies are filled with the graphene by pressure-forming the apatite microcrystalline bodies having the surface coated with the graphene.

In the above-described gas separation membrane, apatite microcrystalline bodies coated with graphene form a membrane in which the spaces between adjacent apatite microcrystalline bodies are filled with graphene by pressure-forming. In the gas separation membrane, since the spaces between adjacent apatite microcrystalline bodies are appropriately filled with graphene, the gas separation performance can be enhanced.

An embodiment in which the graphene has nanowindows can be adopted. As nanowindows are formed in graphene, the selectivity for gases particularly based on the molecular size can be increased, and therefore, the separation performance can be further enhanced.

Advantageous Effects of Invention

According to the present disclosure, a method for producing a gas separation membrane having enhanced gas separation performance, and a gas separation membrane are provided.

DESCRIPTION OF EMBODIMENTS

Figure 1:
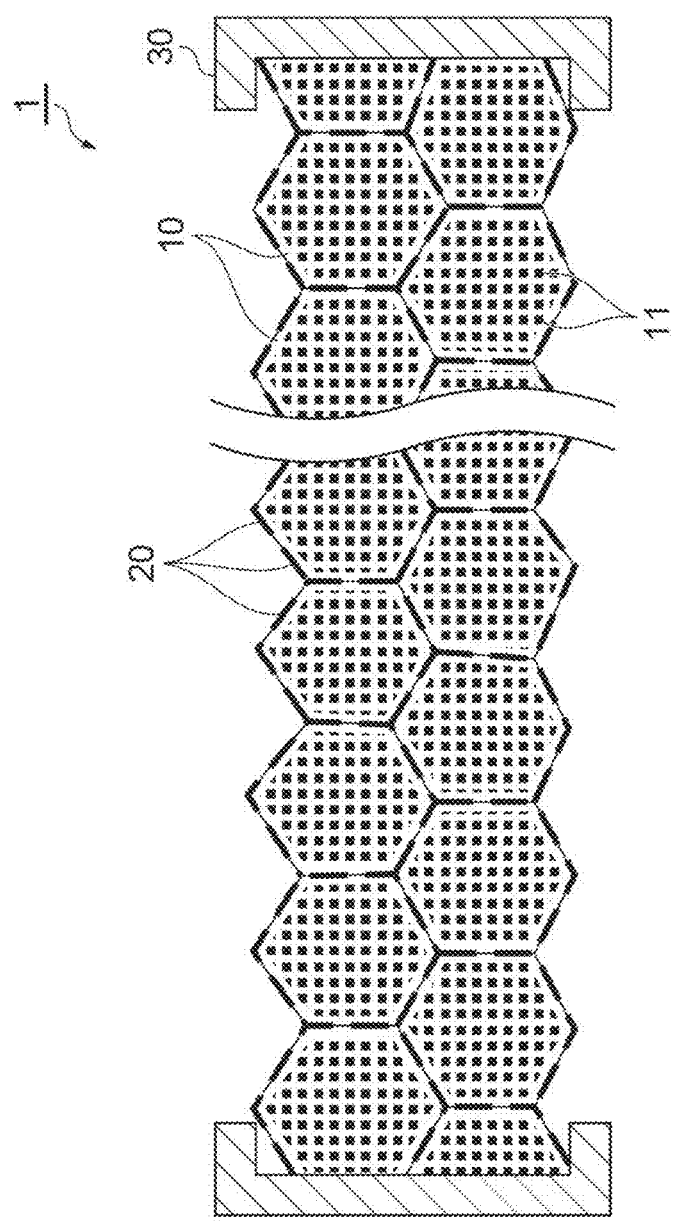
FIG. 1 is a diagram schematically explaining the structure of a gas separation membrane according to an embodiment of the present disclosure.

Hereinafter, embodiments according to the present disclosure will be described in detail with reference to the attached drawings. Incidentally, in the description of the drawings, an identical reference numeral will be assigned to identical elements, and any duplicate description will not be repeated.

First Embodiment: Zeolite Separation Membrane (Zeolite Separation Membrane)

As a first embodiment, a zeolite separation membrane will be described. The zeolite separation membrane according to an embodiment is a gas separation membrane having a function of separating a plurality of kinds of gases by utilizing a minute pore structure of zeolite crystals. The type of the gas as an object to be separated is not limited;

however, for instance, the zeolite separation membrane described in the present embodiment can be used for the separation of hydrogen and methane, or hydrogen and carbon monoxide. As another use application, the zeolite separation membrane can also be used for the separation of hydrogen and oxygen, the separation of carbon dioxide and nitrogen, or methane and nitrogen, and the like. The zeolite separation membrane is composed of a sheet-like membrane in which zeolite microcrystals are bonded by means of graphene by coating the surface of zeolite microcrystalline bodies with graphene.

FIG. 1 is a diagram explaining the structure of a zeolite separation membrane. The gas separation membrane 1 is configured to include zeolite microcrystalline bodies 10 and graphene 20. Furthermore, the gas separation membrane 1 can be used in a state of being supported by a support 30 or the like.

The gas separation membrane 1 is, for example, a sheet-like membrane having a thickness of about 10 μm to 50 μm. Furthermore, the size (diameter) of the principal surface can be set to, for example, about 500 μm to 13 mm. The gas separation membrane 1 is assumed to have a structure in which the main component is a plurality of zeolite microcrystalline bodies 10, and a plurality of graphene 20 molecules are disposed so as to cover the periphery of the zeolite microcrystalline bodies. The shape of the principal surface of the gas separation membrane 1 is not particularly limited and can be set to, for example, a polygonal shape such as a quadrangle, or a circular shape.

A zeolite microcrystalline body 10 is a crystal of MFI zeolite. Zeolite is known to include a large number of zeolites having different skeletal structures. The zeolite used for the zeolite separation membrane described in the present embodiment is MFI zeolite (ZSM-5), and the chemical formula of a unit lattice is $Na_nAl_nSi_{96-n}O_{192} \cdot 16H_2O$ (0<n<27). Incidentally, the skeletal structure of MFI zeolite is defined by the International Zeolite Association. The MFI zeolite can be synthesized up to a size with a particle diameter of about several μm; however, the size (particle diameter) of the zeolite microcrystalline bodies 10 used in the present embodiment is assumed to be in the range of 50 nm to 150 nm. Incidentally, in the gas separation membrane 1, the zeolite microcrystalline bodies 10 have an approximately spherical shape; however, in FIG. 1, the zeolite microcrystalline bodies 10 are schematically shown to have a polygonal shape (hexagonal shape).

Furthermore, a zeolite microcrystalline body 10 has a large number of pores derived from the structure on the surface of the microcrystalline body. The pores in the zeolite microcrystalline bodies 10 have a diameter of 0.54 nm to 0.56 nm. For instance, an MFI zeolite having a crystal particle diameter of 100 nm or less and a pore size of about 0.55 nm (MFI Zeolite manufactured by Mitsubishi Chemical Corporation) can be used as the zeolite microcrystalline bodies 10.

Graphene 20 is provided so as to connect between adjacent zeolite microcrystalline bodies 10. Furthermore, the graphene 20 covers the periphery of the zeolite microcrystalline bodies 10. However, when it is said "covers the periphery of the zeolite microcrystalline bodies 10", it is not implied that the entire surface of the zeolite microcrystalline bodies 10 is covered with the graphene 20, and the zeolite microcrystalline bodies 10 may be exposed in some parts. The graphene 20 is a sheet-like substance having a monatomic thickness, in which carbon atoms are firmly bonded in a benzene ring form.

As shown in FIG. 1, in the gas separation membrane 1, each of a plurality of the zeolite microcrystalline bodies 10 is coated with a plurality of graphene 20 molecules and bonded to adjacent zeolite microcrystalline bodies 10 by means of graphene 20. Accordingly, for example, there may be zeolite microcrystalline bodies 10 on both sides of a pair of principal surfaces of one graphene 20 molecule. Furthermore, the graphene 20 is disposed so as to fill up the spaces between adjacent zeolite microcrystalline bodies 10. Therefore, a state is assumed in which pores penetrating through the spaces between adjacent zeolite microcrystalline bodies 10 in a plan view are not formed, and graphene 20 is provided between the adjacent zeolite microcrystalline bodies 10.

Incidentally, the size (size of the principal surface of a sheet-like structure) of the graphene 20 is smaller than the particle diameter of the zeolite microcrystalline bodies 10 and is assumed to be in the range of, for example, 5 nm to 50 nm. Therefore, the zeolite microcrystalline bodies 10 have their surface covered with a plurality of graphene 20 molecules. The graphene 20 may cover the zeolite microcrystalline bodies 10 in a single layer or may cover the zeolite microcrystalline bodies 10 in a state in which a plurality of graphene 20 molecules are stacked (multilayer state). Incidentally, in FIG. 1, a structure having multiple layers of graphene 20 is not shown, and a state in which a plurality of graphene 20 molecules cover the zeolite microcrystalline bodies 10 in a single layer is schematically shown.

In the graphene 20, a large number of nanowindows (pores having a pore size of about 0.3 nm to 1.5 nm) are formed. When these nanowindows are provided, among the gas separation performance, the selectivity in particular can be further increased.

In the gas separation membrane 1, the mass ratio of the zeolite microcrystalline bodies 10 and the graphene 20 is assumed to be, for example, about 6:100 to 20:100. The mass ratio between the zeolite microcrystalline bodies 10 and the graphene 20 can be determined by a thermogravimetric analysis. For example, the proportion of mass reduction can be checked in a TG curve obtainable by a thermogravimetric analysis in air. From these results, the mass ratio between the zeolite microcrystalline bodies 10 and the graphene 20 in the gas separation membrane 1 can be determined.

The above-described gas separation membrane 1 can be used as a simple substance; however, for example, the gas separation membrane 1 can be used in a state of being supported by a support 30. The support 30 is not particularly limited as long as it can support the gas separation membrane 1 and has openings sufficiently larger than the pore size of the pores carried by the zeolite microcrystalline bodies 10. The support 30 may be, for example, a frame material supporting the outer circumference of the gas separation membrane 1.

(Method for Producing Zeolite Separation Membrane)

Figure 2:
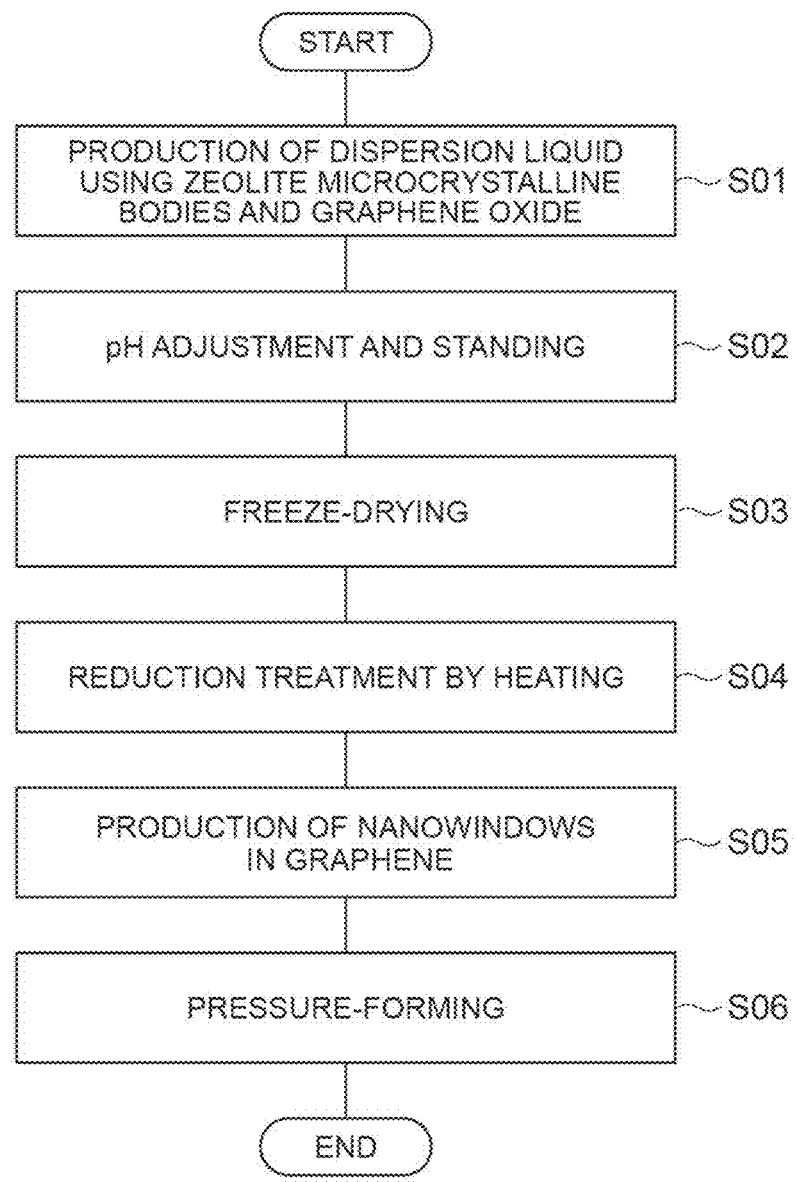
FIG. 2 is a diagram explaining a method for producing a gas separation membrane according to an embodiment of the present disclosure.

The zeolite separation membrane is formed by roughly coating the surface of zeolite microcrystalline bodies with graphene oxide and then bonding these to each other. Therefore, the method for producing a zeolite separation membrane includes, as shown in FIG. 2, a step of producing a dispersion liquid including zeolite microcrystalline bodies and graphene oxide (step S01); a step of adjusting the dispersion liquid to a predetermined pH and leaving the dispersion liquid to stand for a predetermined time (step S02); a step of performing freeze-drying (step S03); a step of heating the residue to perform a reduction treatment (step S04); a step of carrying out the production of nanowindows (step S05); and a step of performing pressure-forming (step S06).

In step S01, zeolite microcrystalline bodies and graphene oxide are mixed in pure water to produce a dispersion liquid. Regarding the zeolite microcrystalline bodies, as described above, an MFI zeolite having a particle diameter in the range of 50 nm to 150 nm and a pore size of 0.54 nm to 0.56 nm is used.

Furthermore, graphene oxide is used for the purpose of bonding the zeolite microcrystalline bodies to each other. The graphene oxide has a structure obtained by oxidizing graphene and includes a hydroxy group, a carboxy group, an epoxy group, and the like. Regarding the graphene oxide used for the production of a zeolite separation membrane, for example, one having a number of layers to be laminated of 5 or less and a particle diameter of about 5 nm to 50 nm is used. When the graphene oxide is separated into single layers, or when the number of laminated layers is small, coating of the zeolite microcrystals and bonding of zeolite microcrystalline bodies to each other can be appropriately carried out. Incidentally, the characteristics of the graphene oxide at the time of being introduced into the dispersion liquid are not particularly limited.

The dispersion liquid of zeolite microcrystalline bodies and graphene oxide can be produced by mixing zeolite microcrystalline bodies and graphene oxide in pure water. The mixing amounts of the zeolite microcrystalline bodies, graphene oxide, and pure water can be set such that the mixing amount of the zeolite microcrystalline bodies can be set to about 10 mg to 20 mg, and the mixing amount of the graphene oxide can be set to about 0.6 mg to 4.0 mg, with respect to 10 ml of pure water. Furthermore, the mixing ratio of the zeolite microcrystalline bodies and the graphene oxide can be set to, for example, about 6:100 to 20:100 as a mass ratio.

In step S02, the pH of the dispersion liquid of the zeolite microcrystalline bodies and graphene oxide is adjusted. As a result, an electrostatic interaction between the zeolite microcrystalline bodies and the graphene oxide in the dispersion liquid is promoted. As a result, a state in which the surface of the zeolite microcrystalline bodies is coated with graphene oxide is formed. According to the results of examining the surface charge density of the graphene oxide, the surface charge density hardly changes at a pH in the range of about 2 to 10. On the other hand, with regard to the zeolite microcrystalline bodies, since the surface charge density changes when the pH changes, the ionic strength between the zeolite microcrystalline bodies and the graphene oxide can be changed by adjusting the pH of the dispersion liquid.

The pH that is the target of adjustment for the dispersion liquid varies depending on the type of the pH adjusting agent to be added for pH adjustment of the dispersion liquid. For example, when the pH is adjusted by means of a salt such as ammonium chloride, the pH as the target of adjustment is assumed to be about 3.6 to 4.0.

Incidentally, regarding the salt to be used for the above-described adjustment of pH, in addition to ammonium chloride, ammonium hydrogen carbonate, ammonium nitrate, and the like are used. On the other hand, when the pH is adjusted by means of a weak base such as aqueous ammonia, the pH as the target of adjustment is assumed to be about 3.6 to 11.0. Regarding the weak base to be used for the adjustment of pH, in addition to aqueous ammonia, tetramethylammonium hydroxide and the like are used.

When the pH of the dispersion liquid is adjusted to the pH in the above-described range by using a pH adjusting agent, and the dispersion liquid is further left to stand for several hours to several dozen hours, the periphery of the zeolite microcrystalline bodies is covered with graphene oxide by an electrostatic interaction between the zeolite microcrystalline bodies and the graphene oxide. When the dispersion liquid adjusted to a predetermined pH is left to stand for a predetermined time, the interaction between the zeolite microcrystalline bodies and the graphene oxide in the dispersion liquid proceeds. The time for leaving to stand is not particularly limited as long as it is a condition in which the interaction between the dispersion liquid can sufficiently proceed; however, for example, it has been verified that when a dispersion liquid adjusted to pH 4.6 by means of ammonium chloride is left to stand for 24 hours, the interaction between the zeolite microcrystalline bodies and the graphene oxide in the dispersion liquid sufficiently proceeds. Whether the interaction will sufficiently proceed can be checked by, for example, the occurrence of separation into a phase of a colloidal dispersion system including zeolite particles and a phase of an aqueous solution that does not include these.

Incidentally, a dispersion liquid for which pH adjustment is achieved by mixing zeolite microcrystalline bodies and graphene oxide into a liquid that has been subjected in advance to pH adjustment, may also be formed. That is, step S01 and step S02 may be carried out at the same time. For example, when a 0.05 M aqueous solution of ammonium chloride is produced, and 9.2 mg of zeolite microcrystalline bodies and 0.8 mg of graphene oxide are mixed into this aqueous solution, a dispersion liquid adjusted to pH 4.6 can be obtained. It is also acceptable to produce a dispersion liquid that has been subjected to pH adjustment by such a procedure.

In step S03, a powder of zeolite microcrystalline bodies coated with graphene oxide is produced by drying the above-described dispersion liquid. For example, when the dispersion liquid is dried under the conditions of a temperature of −40° C. to −30° C. (233 K to 243 K) and a pressure of 5 Pa to 20 Pa in a vacuum freeze-dryer, water in the dispersion liquid is removed, and a powder of zeolite microcrystalline bodies coated with graphene oxide can be obtained. Incidentally, a powder of zeolite microcrystalline bodies coated with graphene oxide may also be obtained by heat-drying, instead of vacuum freeze-drying.

In step S04, the powder of zeolite microcrystalline bodies coated with graphene oxide is subjected to a heating treatment. As a result, reduction (thermal reduction) of the graphene oxide covering the zeolite microcrystalline bodies is carried out.

The heating treatment is carried out, for example, in a temperature range of 220° C. to 300° C. (493 K to 573 K) for about 10 minutes to 6 hours. There are no upper limits in the heating temperature and the heating time; however, reduction of the graphene oxide can be sufficiently carried out by performing heating under the above-mentioned conditions. Regarding the atmosphere at the time of the heating treatment, for example, an argon atmosphere can be employed. For example, in a case where the mass of the zeolite microcrystalline bodies coated with graphene oxide is about 20 mg, graphene oxide is reduced by heating the zeolite microcrystalline bodies up to 573 K at a temperature increase rate of 1 K/min in a heating furnace in an argon atmosphere, maintaining the temperature for 30 minutes, and then cooling to 333 K or lower. By performing a heating treatment under the above-described conditions, the graphene oxide in the periphery of the zeolite microcrystalline bodies is reduced to graphene. As a result, the periphery of the zeolite microcrystalline bodies is in a state of being covered with graphene. Incidentally, as graphene oxide is completely reduced, the performance as a gas separation membrane can be sufficiently exhibited.

When the thermal reduction treatment proceeds to a certain extent, the degree of adhesion between the zeolite microcrystalline bodies and graphene is increased. Therefore, a separation membrane after performing the formation of the separation membrane as will be described below, can be stably formed.

In step S05, nanowindows (pores having a pore size of about 0.3 nm to 1.5 nm) are formed in the graphene by subjecting the graphene after reduction to a further heating treatment.

The heating treatment for forming nanowindows is carried out, for example, in a temperature range of 200° C. to 600° C. (473 K to 873 K) for about 5 minutes to 50 hours. Regarding the atmosphere at the time of the heating treatment, for example, an air atmosphere can be adopted. For example, when the mass of the zeolite microcrystalline bodies coated with graphene is about 20 mg, pores can be formed in the graphene by heating up to 623 K at a temperature increase rate of 1 K/min in a heating furnace in an air atmosphere, maintaining the temperature for 10 minutes, and then cooling to 333 K or lower. Incidentally, as the heating temperature is higher, the pore size of the nanowindows can be made larger.

In step S06, a zeolite separation membrane is formed by pressure-forming a mixture of zeolite microcrystalline bodies and graphene after performing the treatment related to the production of nanowindows. At the stage up to this, the zeolite microcrystalline bodies are in a state of being covered with graphene; however, a separation membrane in a state in which the zeolite microcrystalline bodies are closely disposed with graphene interposed therebetween is formed by promoting the bonding between graphene. As a specific procedure, forming into a membrane form is carried out by applying a pressure of 5 MPa to 40 MPa by compression molding. At the time of forming into a membrane form, for example, a tablet molding machine can be used. As a result, a zeolite separation membrane can be obtained. By adjusting the pressure at the time of pressurization to 5 MPa or higher, a sheet-like separation membrane is formed. On the other hand, destruction of pores (collapse of pores) in the zeolite microcrystalline bodies associated with pressurization can be prevented by adjusting the pressure to 40 MPa or lower. Incidentally, when the pressure at the time of pressure-forming is set to, for example, 10 MPa to 20 MPa, the strength as a membrane can be increased, and a separation membrane in which the damage of pores in the zeolite microcrystalline bodies is suppressed can be obtained.

By going through the above-described step of pressure-forming, a zeolite separation membrane in which the graphene molecules covering the periphery of the zeolite microcrystalline bodies are strongly bonded can be obtained.

The zeolite separation membrane obtained by the above-described procedure can be used as a gas separation membrane with increased rigidity by, for example, supporting the zeolite separation membrane with a support 30 shown in FIG. 1, or the like.

(Characteristics of Zeolite Separation Membrane)

The gas separation membrane 1 described in the present embodiment can separate a mixed gas having different molecular sizes by utilizing a plurality of pores 11 provided in zeolite microcrystalline bodies 10. Specifically, since molecules having a small molecular size can pass through the pores of the zeolite microcrystalline bodies 10, the molecules can pass through the gas separation membrane 1. On the other hand, since molecules having a large molecular size cannot pass through the pores of the zeolite microcrystalline bodies 10, the molecules cannot pass through the gas separation membrane 1. With the gas separation membrane 1, separation of a mixed gas can be carried out accurately by utilizing the difference in the molecular size of the molecules constituting such a mixed gas. Incidentally, when the pore size of the gas separation membrane 1 is adjusted, the gas that is the object of separation for the zeolite separation membrane can be selected.

Particularly, the gas separation membrane 1 described in the present embodiment can be used for the separation of methane and hydrogen. When a mixed gas of methane and hydrogen is passed through the gas separation membrane 1, since hydrogen passes through the gas separation membrane 1 while methane does not pass through the gas separation membrane 1, separation of methane and hydrogen can be suitably carried out by using the gas separation membrane 1. Furthermore, the gas separation membrane 1 also has a feature that the rate of separation of gases is faster than that of conventional gas separation membranes.

As described above, the method for producing a gas separation membrane according to the present embodiment has a step of leaving a dispersion liquid to stand still, the dispersion liquid being obtained by mixing zeolite microcrystalline bodies formed from MFI zeolite and graphene oxide with pure water, and covering the periphery of the zeolite microcrystalline bodies with the graphene oxide; a step of drying the dispersion liquid after being left to stand to obtain a powder; a step of subjecting the powder to a reduction treatment of the graphene oxide by means of heating; and a step of pressure-forming the powder after the reduction treatment so as to be formed into a membrane form. When a gas separation membrane is produced by the above-described method for producing a gas separation membrane, since the gas separation membrane in which the spaces between adjacent zeolite microcrystalline bodies are appropriately filled with graphene is obtained, the gas separation performance can be enhanced.

Furthermore, when the method further has a step of performing a heating treatment at a temperature higher than the heating temperature for the reduction treatment and forming nanowindows in the graphene after reduction, after the step of performing a reduction treatment of the graphene oxide and before the step of forming into a membrane form, nanowindows are provided in the graphene that covers the periphery of the zeolite microcrystalline bodies. As a result, the selectivity for gases particularly based on the molecular size can be increased, and therefore, the separation performance can be further enhanced.

An embodiment in which the dispersion liquid is left to stand still in a state of being adjusted by a pH adjusting agent to the range of pH 3.6 to 11, can be adopted. As described above, the amount of graphene oxide coating the periphery of the zeolite microcrystalline bodies can be increased by adjusting the pH of the dispersion liquid by means of a pH adjusting agent. Particularly, an embodiment in which the pH adjusting agent is ammonium chloride, and the pH of the dispersion liquid is adjusted to the range of 3.6 to 4 by means of a pH adjusting agent, can be adopted.

There is provided a gas separation membrane in a sheet form, in which the surface of a plurality of zeolite microcrystalline bodies formed from MFI zeolite is coated with graphene, and at the same time, the zeolite microcrystalline bodies are bonded to each other by means of graphene, and as the zeolite microcrystalline bodies having the surface coated with graphene are pressure-formed, the spaces between adjacent zeolite microcrystalline bodies are filled with graphene.

In the above-described gas separation membrane, the zeolite microcrystalline bodies coated with graphene form a membrane in which the spaces between adjacent zeolite microcrystalline bodies are filled with graphene. In the above-described gas separation membrane, since the spaces between adjacent zeolite microcrystalline bodies are appropriately filled with graphene, the gas separation performance can be enhanced.

An embodiment in which graphene has nanowindows can be adopted. As nanowindows are formed in the graphene, the selectivity for gases particularly based on the molecular size can be increased, and therefore, the separation performance can be further enhanced.

Thus, several embodiments have been described; however, the present disclosure is not intended to be limited to the above-described embodiments. Furthermore, the contents of description of the above-mentioned embodiments can be applied to each other.

Second Embodiment: Apatite Separation Membrane (Apatite Separation Membrane)

As a gas separation membrane according to a second embodiment, an apatite separation membrane obtained by changing the zeolite microcrystalline bodies to apatite microcrystalline bodies will be described. The apatite microcrystalline bodies used for the apatite separation membrane according to the second embodiment is different from the zeolite microcrystalline bodies in that the apatite microcrystalline bodies do not have a minute pore structure. However, with regard to the apatite separation membrane, gas separation performance similar to that of the zeolite separation membrane can be obtained by coating the surface of the apatite microcrystalline bodies with graphene. That is, the apatite separation membrane described in the present embodiment can also be used for the separation of hydrogen and methane or hydrogen and carbon monoxide, separation of hydrogen and oxygen, separation of carbon dioxide and nitrogen, separation of methane and nitrogen, and the like. The apatite separation membrane also has a structure similar to the structure of the zeolite separation membrane shown in FIG. 1. However, as described above, since the apatite microcrystalline bodies do not have pores, the apatite separation membrane is different from the zeolite separation membrane from that point of view.

Incidentally, in the second embodiment, the difference between the apatite separation membrane and the zeolite separation membrane will be described; however, the parts that are not described regarding the apatite separation membrane are similar to those regarding the zeolite separation membrane.

The apatite microcrystalline bodies used for the apatite separation membrane are crystals of hydroxyapatite. The chemical formula is $Ca_5(PO_4)_3(OH)$. Incidentally, hydroxyapatite has a structure of the hexagonal system. The size (particle size) of the apatite microcrystalline bodies used in the present embodiment is assumed to be in the range of 2 μm to 3 μm. Incidentally, in the gas separation membrane 1, the external shape of the hydroxyapatite microcrystalline bodies is a plate shape.

Also for the apatite separation membrane, similarly to the gas separation membrane 1 shown in FIG. 1, each of a plurality of apatite microcrystalline bodies (corresponding to the zeolite microcrystalline bodies 10 shown in FIG. 1) is coated with a plurality of graphene 20 molecules and is bonded to adjacent apatite microcrystalline bodies by means of the graphene 20. As a result, the apatite separation membrane has a shape similar to that of the zeolite separation membrane according to the first embodiment.

The same also applies to the fact that a large number of nanowindows (pores having a pore size of about 0.3 nm to 1.5 nm) are formed in the graphene 20.

Furthermore, in the apatite separation membrane, the mass ratio between the apatite microcrystalline bodies and the graphene is assumed to be, for example, about 4:100 to 20:100.

(Method for Producing Apatite Separation Membrane)

The apatite separation membrane is formed by roughly coating the surface of apatite microcrystalline bodies with graphene oxide and then bonding these crystalline bodies to each other. The apatite separation membrane is similar to the zeolite separation membrane from this point of view. Therefore, the method for producing an apatite separation membrane is similar to the method for producing a zeolite separation membrane described in the first embodiment. The method for producing a zeolite separation membrane is as shown in FIG. 2 and includes a step of producing a dispersion liquid including zeolite microcrystalline bodies and graphene oxide (step S01); a step of adjusting the dispersion liquid to a predetermined pH and leaving the dispersion liquid to stand for a predetermined time (step S02); a step of performing freeze-drying (step S03); a step of performing a reduction treatment by heating (step S04); a step of performing the production of nanowindows (step S05); and a step of performing pressure-forming (step S06). By changing the zeolite microcrystalline bodies used in each step to apatite microcrystalline bodies, the method for producing an apatite separation membrane can be obtained.

Incidentally, regarding the apatite microcrystalline bodies used in step S01, hydroxyapatite having a particle size in the range of 2 μm to 3 μm is used as described above. Furthermore, in the step of adjusting the dispersion liquid to a predetermined pH and leaving the dispersion liquid to stand for a predetermined time (step S02), the pH of the dispersion liquid produced by mixing apatite microcrystalline bodies and graphene oxide in pure water is about 9.3, and this is different from the dispersion liquid of zeolite microcrystalline bodies and graphene oxide. Therefore, for example, when the pH is adjusted by means of salts such as ammonium chloride, the pH as the target of adjustment is assumed to be about 6.0 to 9.3.

In the above-described gas separation membrane according to the second embodiment, apatite microcrystalline bodies coated with graphene are pressure-formed, and as a result, a membrane in which the spaces between adjacent apatite microcrystalline bodies are filled with graphene is formed. In the above-described gas separation membrane, since the spaces between adjacent apatite microcrystalline bodies are appropriately filled with graphene, the gas separation performance can be enhanced.

The graphene can be an embodiment having nanowindows. As nanowindows are formed in the graphene, the selectivity for gases particularly based on the molecular size can be increased, and therefore, the separation performance can be further enhanced.

Thus, several embodiments have been described; however, the present disclosure is not intended to be limited to the above-described embodiments. Furthermore, the contents of description of the above-mentioned embodiments can be applied to each other.

EXAMPLES

Hereinafter, the contents of the present disclosure will be described in more detail with reference to Examples and Comparative Examples. However, the present disclosure is not intended to be limited to the following Examples.
1. Zeolite Separation Membrane
(Examination Related to pH Adjustment)

In the method for producing a gas separation membrane described in the present embodiment, as described above, the periphery of zeolite microcrystalline bodies 10 is covered with graphene oxide by subjecting a dispersion liquid to pH adjustment and then leaving the dispersion liquid to stand. The relationship between pH and the coating amount (weight) of graphene oxide at this time was examined. The results are shown in FIG. 3.

Figure 3:
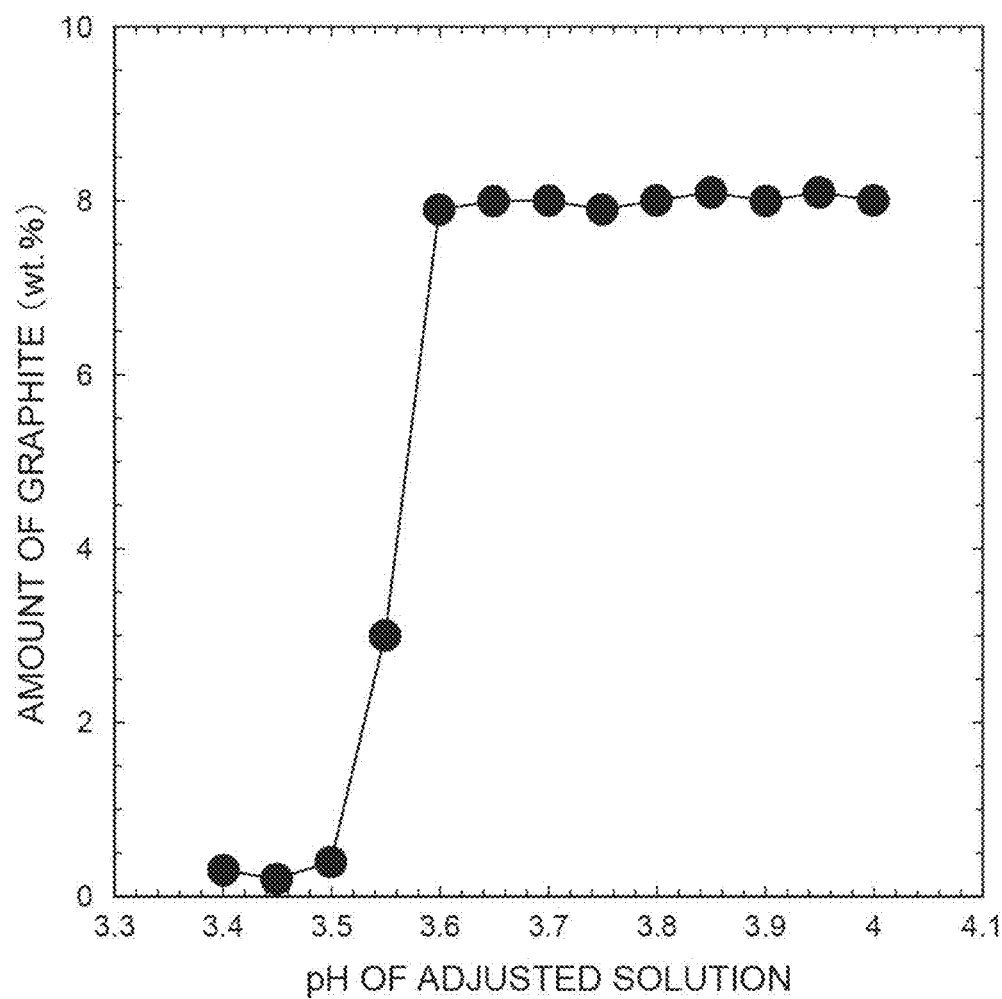
FIG. 3 is a diagram showing the relationship between pH and the coating amount of graphene with regard to the method for producing a gas separation membrane (zeolite separation membrane).

A dispersion liquid in which 2.0 mg of graphene oxide (Hummer method graphene oxide manufactured by Shinshu University) and 20 mg of MFI zeolite microcrystalline bodies (manufactured by Mitsubishi Chemical Corporation, particle size 100 nm, pore size 0.55 nm) were dispersed in 10 mL of pure water was prepared, and solutions at various pHs (pH 3.40, pH 3.45, pH 3.50, pH 3.55, pH 3.60, pH 3.65, pH 3.70, pH 3.75, pH 3.80, pH 3.85, pH 3.90, pH 3.95, and pH 4.00) as shown in FIG. 3 were prepared using an aqueous solution of ammonium chloride (concentration 1 M). After each of these solutions was left to stand for 24 hours at 25° C., the lower layer solution separated into two phases was collected with a micropipette and was evaporated to solid dryness. A powder obtained as such was subjected to a thermogravimetric analysis in air, and a TG curve was created. In the obtained TG curve, the weight reduction proportion at 750 K to 800 K is assumed to be weight of graphene, and the proportion (% by mass) of graphene was estimated.

In FIG. 3, the axis of abscissa represents the pH of the dispersion liquid (prepared solution), and the axis of ordinate represents the coating proportion of graphite (quantity of graphite included in the dry powder: % by mass).

Example 1

A dispersion liquid in which 1.6 mg of graphene oxide (Hummer method graphene oxide manufactured by Shinshu University) and 18.4 mg of MFI zeolite microcrystalline bodies (manufactured by Mitsubishi Chemical Corporation, particle size 100 nm, and pore size 0.55 nm) were dispersed in 10 mL of a 0.05 M aqueous solution of ammonium chloride, was prepared. The pH of the dispersion liquid at this time was 4.6. A solution resulting from leaving this dispersion liquid to stand at 25° C. for 24 hours was placed in a vacuum freeze-dryer and was dried under the conditions of a temperature of 223 K and a pressure of 10 Pa, and thereby 20 mg of a powder of zeolite microcrystalline bodies coated with graphene oxide was obtained.

The obtained powder was loaded on a quartz boat and was set up in a heating furnace in an argon atmosphere. The powder was heated at a temperature increase rate of 1 K/min in an argon gas stream, maintained for 30 minutes at a temperature of 573 K, and then naturally cooled. When the heating furnace was cooled to a temperature of 333 K or lower, the argon gas stream was stopped, and the quartz boat was taken out from the heating furnace. The mass of the powder obtained after heating was 14 mg.

Next, the powder taken out from the heating furnace was loaded on a quartz boat and set up in an electric furnace. The powder was heated at a temperature increase rate of 1 K/min in air, maintained for 10 minutes at a temperature of 623 K, and then naturally cooled. When the temperature of the electric furnace was cooled to a temperature of 333 K or lower, the quartz boat was taken out from the electric furnace. The mass of the powder obtained after heating was 13.8 mg.

Figure 4:
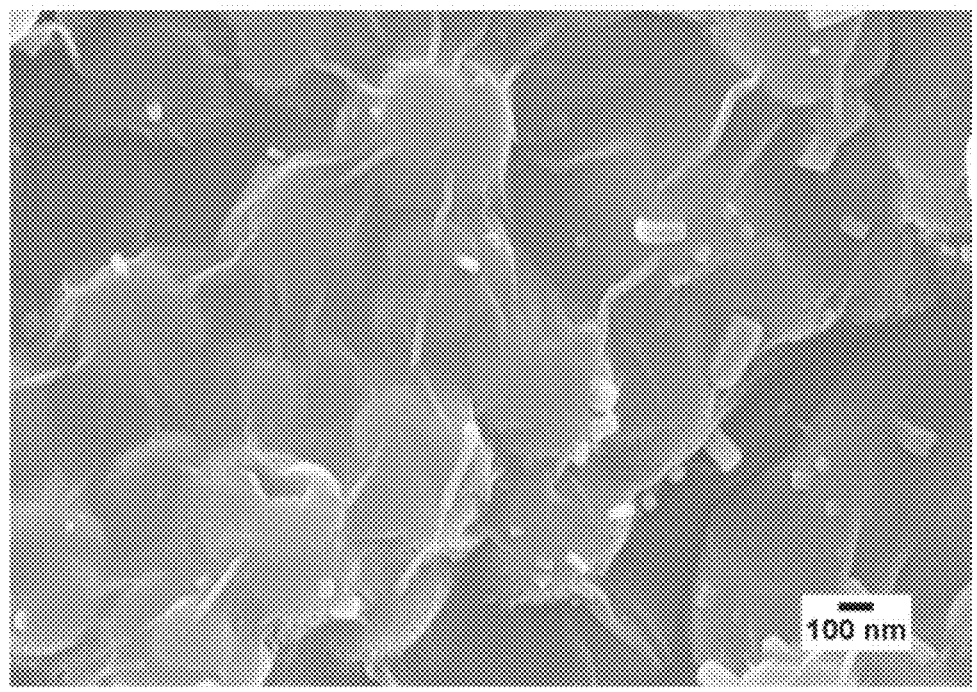
FIG. 4 is a SEM image of a gas separation membrane (zeolite separation membrane).

The powder taken out from the electric furnace was pressure-formed into a membrane form using a tablet forming machine. The pressure at the time of pressurizing was set to 15 MPa. As a result, a zeolite separation membrane according to Example 1 was obtained. The zeolite separation membrane according to Example 1 had a circular shape with an outer diameter of 8 mm in a plan view. Incidentally, the thickness of the zeolite separation membrane according to Example 1 was estimated to be 90 nm by calculation based on density. A SEM image of the zeolite separation membrane according to Example 1 is shown in FIG. 4.

Comparative Example 1: MFI Zeolite 18.4 mg of MFI zeolite (manufactured by Mitsubishi Chemical Corporation, particle size 100 nm, pore size 0.55 nm) was prepared and was pressure-formed into a membrane form using a tablet forming machine. The pressure at the time of pressurizing was set to 15 MPa, and thus a separation membrane according to Comparative Example 1 was obtained.

Comparative Example 2: Graphene Oxide 10 mg of graphene oxide (Hummer method graphene oxide manufactured by Shinshu University) was prepared and was pressure-formed into a membrane form using a tablet forming machine. The pressure at the time of pressurizing was set to 15 MPa, and thus a separation membrane according to Comparative Example 2 was obtained.

Comparative Example 3

A dispersion liquid in which 1.6 mg of graphene oxide (Hummer method graphene oxide manufactured by Shinshu University) and 18.4 mg of MFI zeolite microcrystalline bodies (manufactured by Mitsubishi Chemical Corporation, particle size 100 nm, pore size 0.55 nm) were dispersed in 10 mL of a 0.05 M aqueous solution of ammonium chloride was prepared. The pH of the dispersion liquid at this time was 4.6. A solution resulting from leaving this dispersion liquid to stand at 25° C. for 24 hours was filtered through an alumina filter (pore size 100 nm). As a result, a membrane-like body in which MFI zeolite coated with graphene oxide was laminated on the alumina filter was obtained. This membrane-like body was inserted into a dryer at 110° C., and the membrane was dried to remove the moisture remaining in the membrane-like body.

The dried membrane-like body was set up in a heating furnace in an argon atmosphere. The membrane-like body was heated at a temperature increase rate of 1 K/min in an argon gas stream, maintained for 30 minutes at a temperature of 573 K, and then naturally cooled. When the heating furnace was cooled to a temperature of 333 K or lower, the argon gas stream was stopped, and the membrane-like body was taken out from the heating furnace. As a result, a separation membrane according to Comparative Example 3 was obtained.

Reference Example 1

The powder before forming (graphene oxide powder) used for the production of the separation membrane according to Comparative Example 2 was loaded on a quartz boat and was set up in a heating furnace in an argon atmosphere. The powder was heated at a temperature increase rate of 1 K/min in an argon gas stream, maintained for 30 minutes at a temperature of 573 K, and then naturally cooled. When the heating furnace was cooled to a temperature of 333 K or lower, the argon gas stream was stopped, the quartz boat was taken out from the heating furnace, and a powder according to Reference Example 1 was obtained. This powder corresponds to a graphene powder obtained by subjecting graphene oxide to a reduction treatment.

<Comparison of Structures>

A SEM observation was conducted on the powder before pressure-forming (powder of zeolite microcrystalline bodies in a state of having their periphery covered with graphene), which was used for the production of the zeolite separation membrane according to Example 1, the powder before forming (zeolite microcrystalline bodies), which was produced for the production of the separation membrane according to Comparative Example 1, and the powder (graphene powder) according to Reference Example 1. Furthermore, measurement of the specific surface area was performed for each powder by using a specific surface area meter (manufactured by Quantachrome Instruments, product No.: Autosorb iQ). The results are shown in Table 1.

TABLE 1

| | Shape | Specific surface area |
|---|---|---|
| Example 1 | Spherical particles are covered with a film | 380 m²/g |
| Comparative Example 1 | Spherical shape having a diameter of about 100 nm | 400 m²/g |
| Reference Example 1 | Plate shape | 3000 m²/g |

<Nitrogen Adsorption Measurement>

Nitrogen adsorption measurement was performed for the powder before pressure-forming (powder of zeolite microcrystalline bodies in a state of having their periphery covered with graphene), which was used for the production of the zeolite separation membrane according to Example 1, and the powder before forming (zeolite microcrystalline bodies), which was used for the production of the separation membrane according to Comparative Example 1.

Regarding the measurement, three steps of "adsorption measurement pretreatment", "measurement of the adsorption branch of an adsorption isotherm", and "measurement of the desorption branch" for removing the moisture and the like adsorbing to the powder of the sample were carried out in this order. The apparatus used was a fully automated gas adsorption amount measuring apparatus (manufactured by Quantachrome Instruments, product No.: Autosorb iQ).

In the adsorption measurement pretreatment, each of the powder samples according to Example 1 and Comparative Example 1 was maintained for 3 hours under the conditions of a pressure of 1 mPa or less and a temperature of 250° C.

Next, regarding the measurement of the adsorption branch, sample cells holding the powder samples according to Example 1 and Comparative Example 1 were maintained at 77 K in a vacuum, nitrogen gas was introduced into the samples in that state, and the amounts of adsorption of nitrogen were sequentially measured from low pressures. Next, regarding the measurement of the desorption branch, the amounts of adsorption of nitrogen to the powder samples were sequentially measured from high pressures by gradually reducing the pressure from the pressure after the measurement of the adsorption branch.

Figure 5:
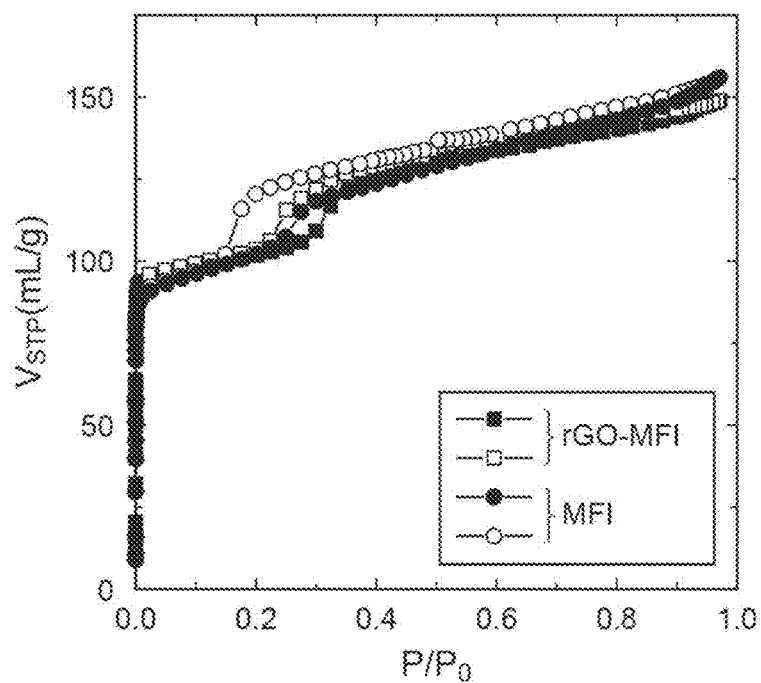
FIG. 5(a) and FIG. 5(b) are diagrams showing nitrogen adsorption isotherms according to the gas separation membrane (zeolite separation membrane).
Figure 5:
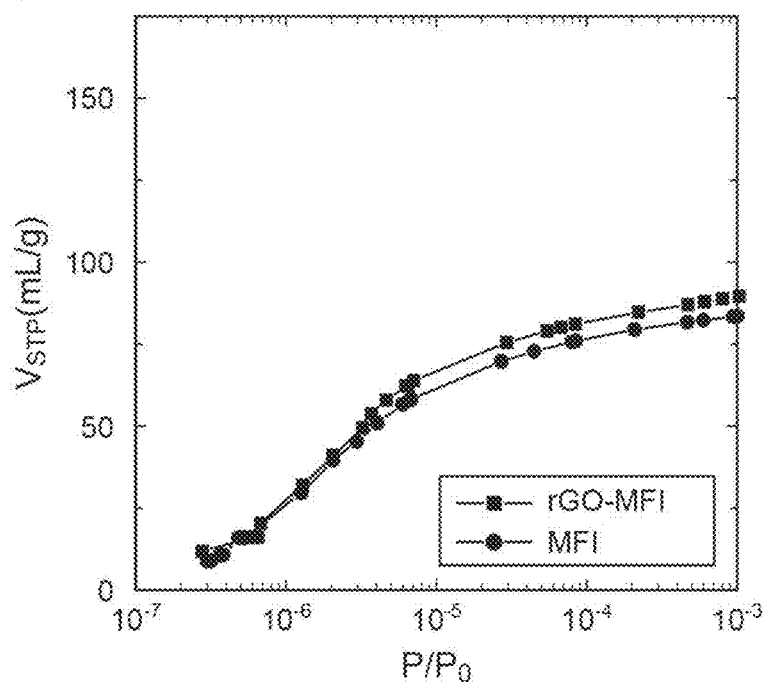

Nitrogen adsorption isotherms obtained by means of the results of the above-described measurement are shown in FIG. 5(a) and FIG. 5(b). FIG. 5(a) is a diagram showing the entirety of the nitrogen adsorption isotherms, and FIG. 5(b) is an enlarged view of the rising portion (low pressure portion). In FIG. 5, black-filled marks represent adsorption branches, and white-filled marks represent desorption branches. Since the MFI zeolite constituting the zeolite separation membrane originally has no mesopores (pores having a size of 2 to 50 nm), only a rapid rise in the amount of adsorption near the relative pressure of zero is observed, and no adsorption hysteresis should be observed; however, in the results shown in FIG. 5, an adsorption hysteresis near the relative pressure of 0.2 suggesting the presence of pores was confirmed. This is speculated to be because gaps between the particles were narrowed by pressure-forming during the production of powder, and these gaps between the particles played the role of pores. Furthermore, when coating with graphene is formed as in Example 1, results in which an adsorption hysteresis near the relative pressure of 0.2 was slightly changed at high pressures were obtained, and from these results, it is considered that the above-described gaps between the particles are acting as pores more effectively.

<Thermogravimetric Analysis>

A thermogravimetric analysis in air was conducted on each of the powder before pressure-forming (powder of zeolite microcrystalline bodies in a state of having the periphery of graphene) used for the production of the zeolite separation membrane according to Example 1, the powder before forming (zeolite microcrystalline bodies) used for the production of the separation membrane according to Comparative Example 1, the powder before forming (graphene oxide) used for the production of the separation membrane according to Comparative Example 2, and ammonium chloride, and TG curves were created. The results are shown in FIG. 6.

Figure 6:
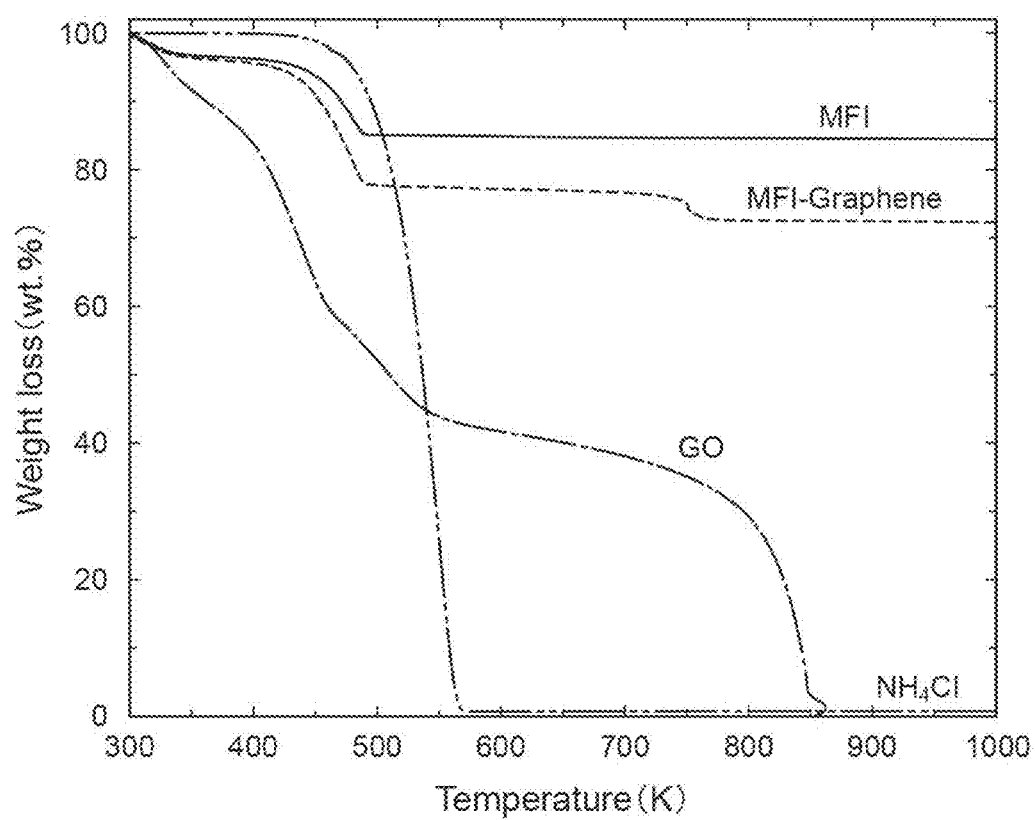
FIG. 6 is a diagram showing TG curves of the powder samples of Examples and Comparative Examples according to the gas separation membrane (zeolite separation membrane).

From the results shown in FIG. 6, it was confirmed that the weight of MFI-Graphene (powder corresponding to Example 1) was reduced by 8% at 750 K to 800 K. This weight reduction is considered to originate from combustion of graphene. Therefore, it is speculated that 8% by mass of graphene is included in the MFI-Graphene (powder corresponding to Example 1). Furthermore, ammonium chloride ($NH_4Cl$) was used; however, in the results shown in FIG. 6, it was confirmed that the weight was reduced in the range of 500 K to 750 K. From this, it was confirmed that ammonium chloride was removed in the process of the heating treatment.

<Evaluation of Permeability>

Figure 7:
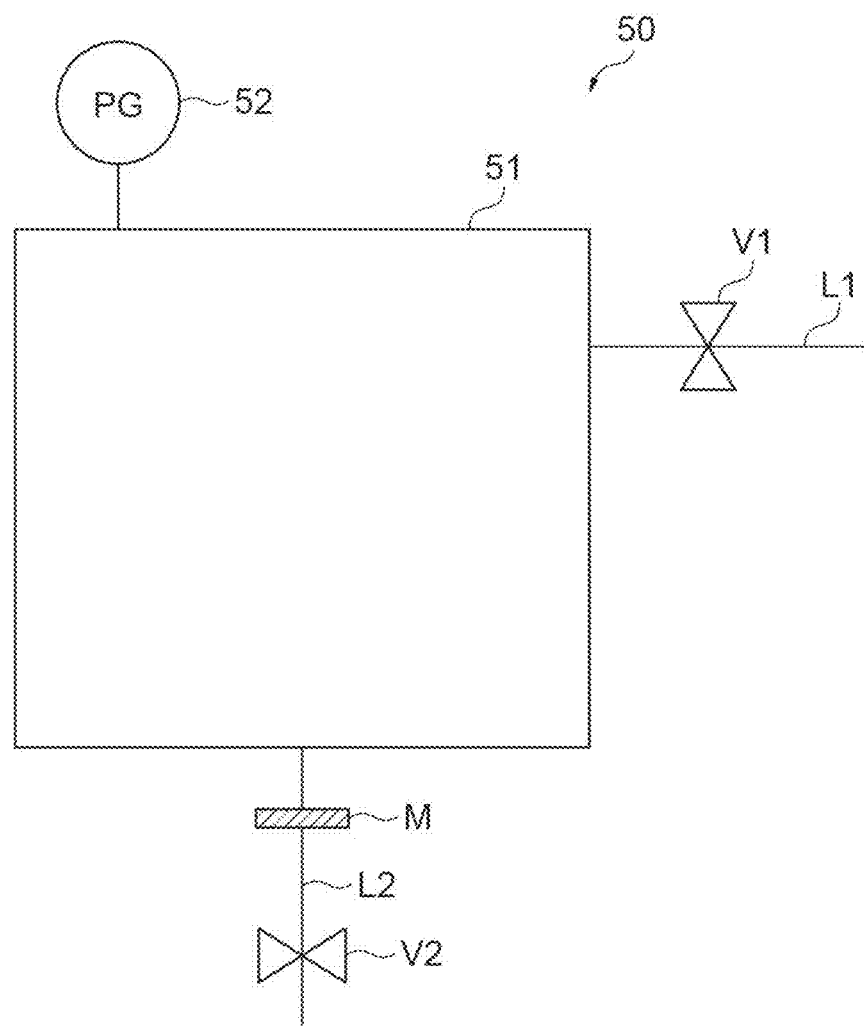
FIG. 7 is a diagram explaining an apparatus used when gas separation performance was evaluated.

The apparatus 50 shown in FIG. 7 was prepared. The apparatus 50 has a chamber 51 having a capacity of 100 cm³ with no change in the volume; a pressure gauge 52; an inlet flow channel L1 having a valve V1; and an exhaust flow channel L2 having a valve V2. Furthermore, the separation membrane M as an object of evaluation is attached upstream of the valve V2 on the exhaust flow channel L2.

Inside the chamber 51, the temperature is kept constant at 302 K. Into this chamber 51, a mixed gas in which the mixing volume ratio of hydrogen ($H_2$):methane ($CH_4$) was 1:1 was introduced through the inlet flow channel L1 until the pressure reached 120 kPa. At the time point where the pressure inside the chamber 51 reached 120 kPa, the valve V1 of the inlet flow channel L1 was closed. Subsequently, the valve V2 of the exhaust flow channel L2 was released. In this state, the change over time in the pressure inside the chamber 51 was measured by using the pressure gauge 52. Furthermore, the gas discharged through the exhaust flow channel L2 was measured with a mass analyzer, and the concentration ratio of gas was determined. Incidentally, in the case of the mixed gas of hydrogen:methane, it is considered that hydrogen passes through the gas separation membrane, and methane remains in the chamber 51.

Figure 8:
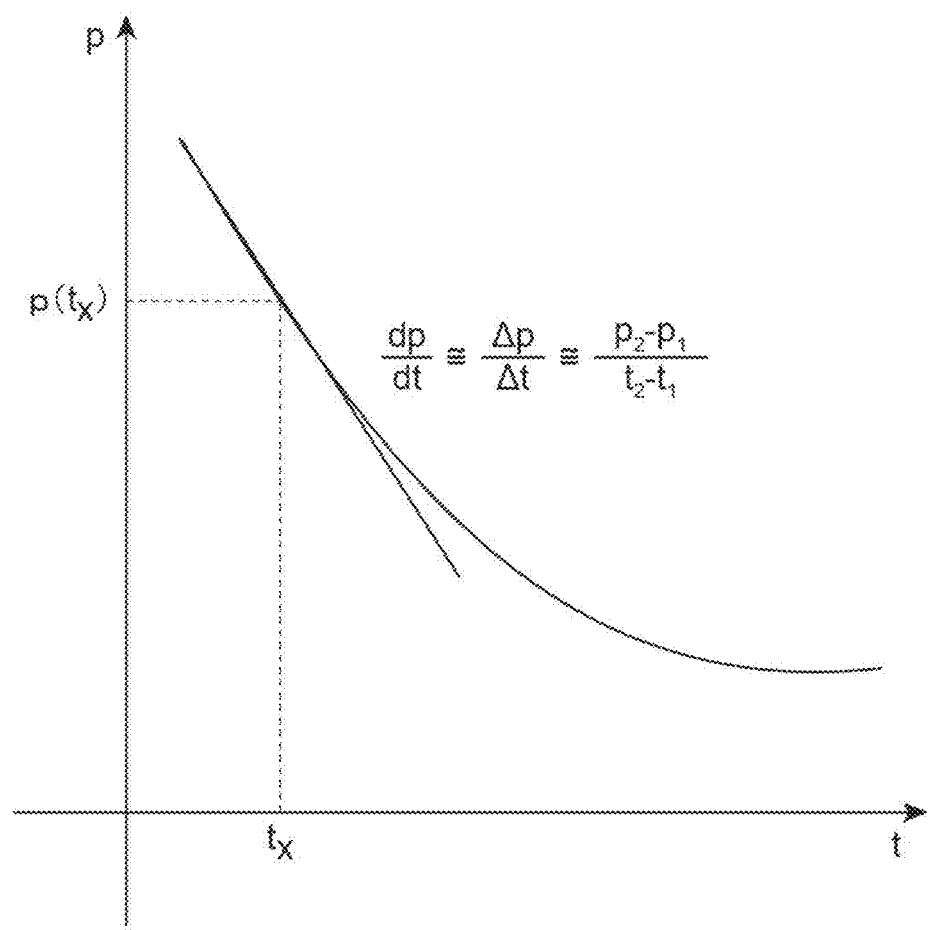
FIG. 8 is a diagram explaining the results of measuring permeability.

FIG. 8 schematically shows the results of plotting the values of pressure with respect to time. As also shown in FIG. 7, the change in pressure with respect to time, dp/dt, can be determined from the pressure p1 at the time t1 and the pressure p2 at the time t2. That is, since dp/dt is substantially equal to $\Delta p/\Delta t$, dp/dt is considered to be substantially equal to (p2−p1)/(t2−t1), and dp/dt can be calculated from this relationship. On the other hand, dp/dt can also be described as the following Mathematical Formula (1). Here, p represents the pressure (Pa) of the chamber; A represents the permeation area of the membrane; R represents the gas constant; T represents temperature; V represents the volume of the chamber; and N represents the flux.

[Mathematical Formula 1]

$$\frac{dp}{dt} = -\frac{ART}{V}N \quad (1)$$

Based on the relationship represented by this Mathematical Formula (1), permeability P can be determined by the following Mathematical Formula (2).

[Mathematical Formula 2]

$$P = \frac{N}{\Delta p} = -\frac{dp}{dt} \times \frac{V}{ART} \times \frac{1}{\Delta p} \quad (2)$$

For each of the separation membranes shown in Example 1 and Comparative Examples 1 to 3, the hydrogen permeability was calculated based on the above-described mathematical formula. The permeability can serve as an indicator representing how fast the gas separation proceeds in a gas separation membrane.

Figure 9:
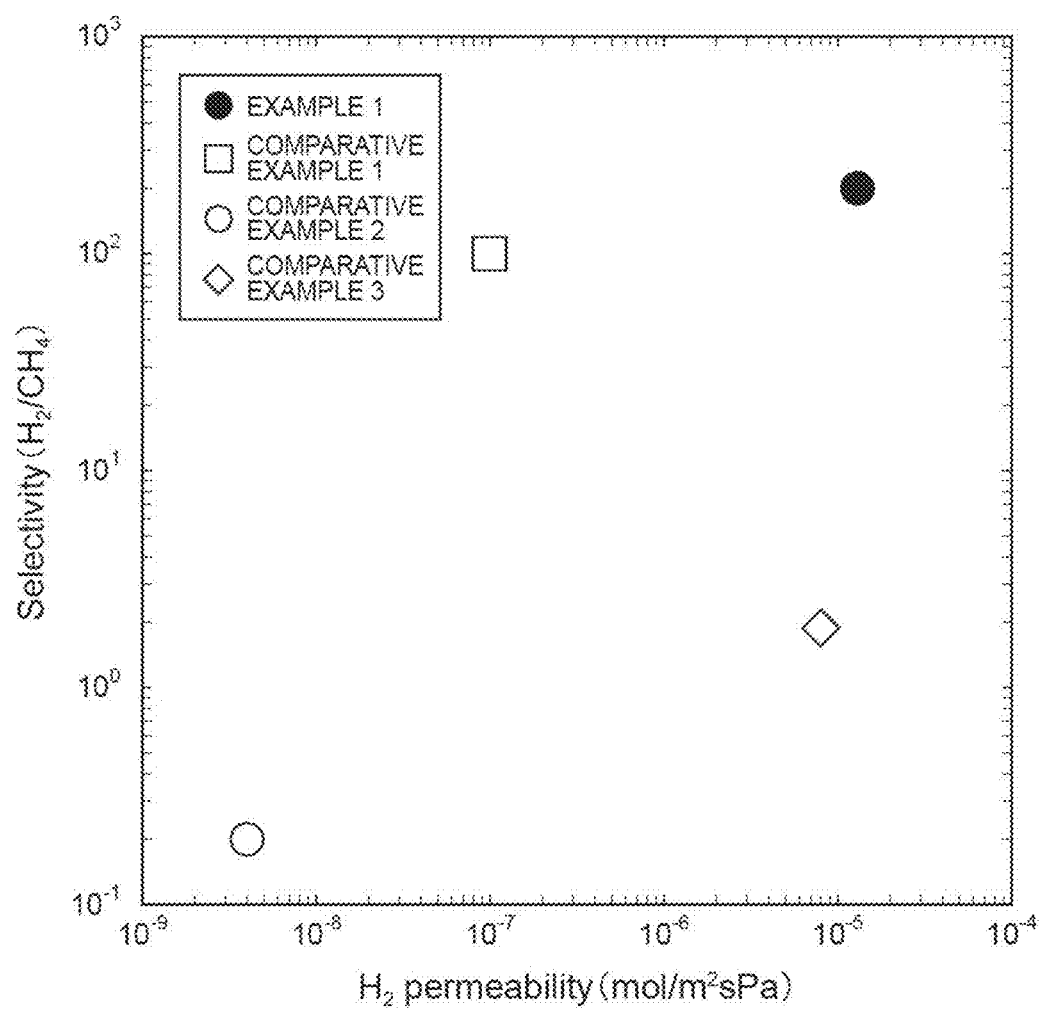
FIG. 9 is a diagram showing the results of evaluating the gas separation performance.

In FIG. 9, the measurement results for each of the gas separation membranes of Example 1 and Comparative Examples 1 to 3 are plotted, with the axis of abscissa representing the hydrogen permeability and the axis of ordinate representing selectivity. In the case of a mixed gas of hydrogen:methane, hydrogen passes through the gas separation membrane, and methane remains in the chamber 51. Therefore, the concentration of hydrogen with respect to methane in the exhausted gas was plotted.

When the experiment results shown in FIG. 9 (upper diagram) were subjected to model analysis, it was concluded that the mechanism by which gas permeates through the "membrane of zeolite microcrystalline bodies coated with graphene" is dominantly based on Knudsen diffusion. The Knudsen diffusion is a diffusion mechanism in which the mean free path of diffusion molecules (here, molecules that permeate the membrane) is sufficiently large, collision between the molecules hardly occurs, and the permeating molecules permeate through the pores while colliding only with the wall surface of the porous body to be permeated.

In such a Knudsen diffusion process, since deceleration of the permeation rate due to the collision between molecules does not occur, the diffusion rate is higher than that of conventional molecular diffusion (the mean free path is small, and the molecules diffuse while colliding with each other). When the size of the zeolite microcrystalline bodies is about 100 nm, the size is a size comparable to the mean free path (about 70 nm) of molecules at normal pressure.

Furthermore, it is considered that the pores of the zeolite microcrystalline bodies have a cylindrical shape with a diameter of approximately 0.55 nm, and since the pores penetrate through zeolite, the molecules that permeate through the gas separation membrane permeate through these linear cylindrical-shaped pores only. Therefore, it was assumed that molecules permeate through the zeolite particles almost without colliding with the pore wall surfaces and mostly without decelerating.

<Gas Permeability>

Figure 10:
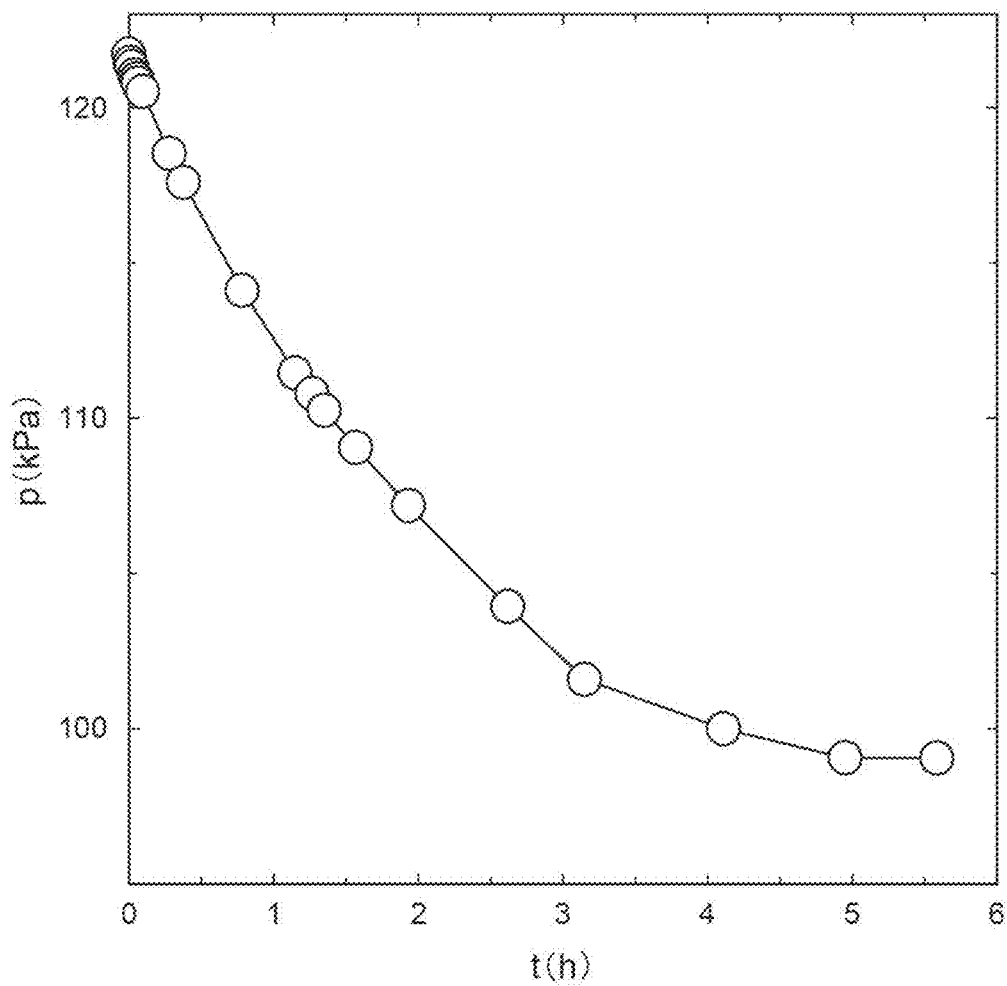
FIG. 10 is a diagram showing the results of evaluating the gas permeability related to the gas separation membrane (zeolite separation membrane).

The permeability to gases was evaluated by using the apparatus 50 shown in FIG. 7. Inside the chamber 51 of the apparatus 50, the temperature was kept constant at 303 K. Into this chamber 51, a mixed gas in which the mixing volume ratio of hydrogen ($H_2$):methane ($CH_4$):sulfur hexafluoride ($SF_6$) was 1:1:1 was introduced through the inlet flow channel L1 until the pressure reached 120 kPa. At the time point where the pressure inside the chamber 51 reached 120 kPa, the valve V1 of the inlet flow channel L1 was closed. Subsequently, the valve V2 of the exhaust flow channel L2 was released. In this state, the change over time in the pressure inside the chamber 51 was measured by using the pressure gauge 52. The pressure change with respect to the time change is shown in FIG. 10. From the results shown in FIG. 10, the permeability was determined to be $6.02 \times 10^{-7}$ mol/$m^2$sPa.

2. Apatite Separation Membrane

Example 2

A dispersion liquid in which 0.99 mg of graphene oxide (Hummer method graphene oxide manufactured by Shinshu University) and 50 mg of hydroxyapatite microcrystalline bodies (manufactured by Sigma-Aldrich Co. LLC., particle size 2.5 μm) were dispersed in 100 mL of a 0.01 M aqueous solution of ammonium chloride, was prepared. The pH of the dispersion liquid at this time was 7.63. A solution resulting from leaving this dispersion liquid to stand at 25° C. for 24 hours was placed in a vacuum freeze-dryer and was dried under the conditions of a temperature of 223 K and a pressure of 10 Pa, and thereby 51 mg of a powder of apatite microcrystalline bodies coated with graphene oxide was obtained.

The obtained powder was loaded on a quartz boat and was set up in a heating furnace in an argon atmosphere. The powder was heated at a temperature increase rate of 1 K/min in an argon gas stream, maintained for 30 minutes at a temperature of 573 K, and then naturally cooled. When the heating furnace was cooled to a temperature of 333 K or lower, the argon gas stream was stopped, and the quartz boat was taken out from the heating furnace. The mass of the powder obtained after heating was 48 mg.

Next, the powder taken out from the heating furnace was loaded on a quartz boat and set up in an electric furnace. The powder was heated at a temperature increase rate of 1 K/min in air, maintained for 10 minutes at a temperature of 623 K, and then naturally cooled. When the temperature of the electric furnace was cooled to a temperature of 333 K or lower, the quartz boat was taken out from the electric furnace. The mass of the powder obtained after heating was 47.2 mg.

Figure 11:
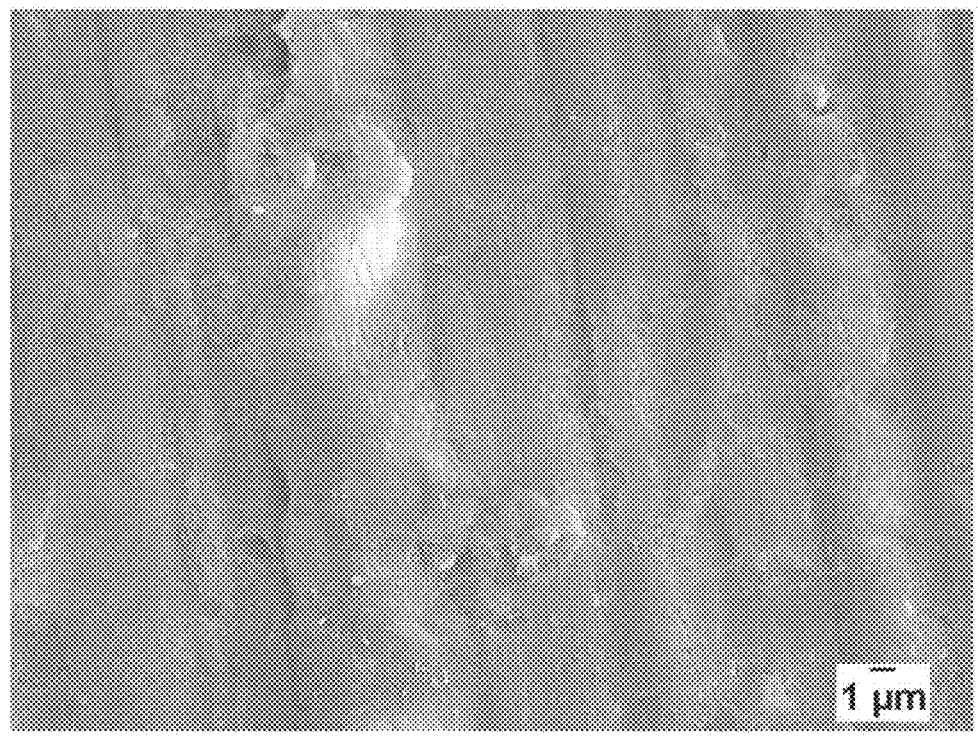
FIG. 11 is a SEM image of a gas separation membrane (apatite separation membrane).

The powder taken out from the electric furnace was pressure-formed into a membrane form using a tablet forming machine. The pressure at the time of pressurizing was set to 15 MPa. As a result, an apatite separation membrane according to Example 2 was obtained. The apatite separation membrane according to Example 2 had a circular shape with an outer diameter of 8 mm in a plan view. Incidentally, the thickness of the apatite separation membrane according to Example 2 was estimated to be 90 nm by calculation based on density. A SEM image of the apatite separation membrane according to Example 2 is shown in FIG. 11.

Comparative Example 4: Hydroxyapatite 18.4 mg of hydroxyapatite (manufactured by Sigma-Aldrich Co. LLC., particle size 2.5 µm) was prepared and was pressure-formed into a membrane form using a tablet forming machine. The pressure at the time of pressurizing was set to 15 MPa, and thus a separation membrane according to Comparative Example 4 was obtained.

<Nitrogen Adsorption Measurement>

Similarly to the evaluation related to the zeolite separation membrane, nitrogen adsorption measurement was performed for the powder before pressure-forming (powder of apatite microcrystalline bodies in a state of having their periphery covered with graphene), which was used for the production of the apatite separation membrane according to Example 2, and the powder before forming (apatite microcrystalline bodies), which was used for the production of the separation membrane according to Comparative Example 4. The procedure of the operation was similar to the above-mentioned procedure related to Example 1 and Comparative Example 1.

Figure 12:
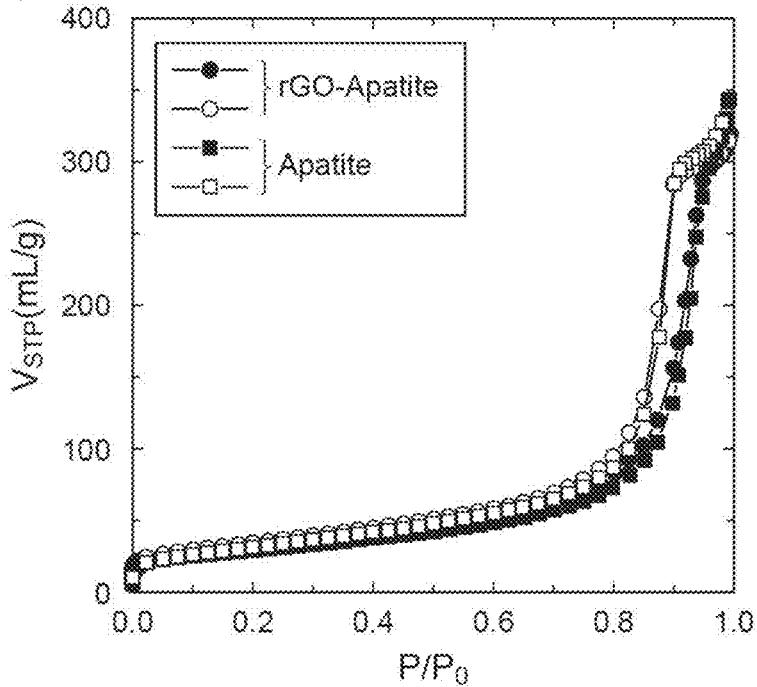
FIG. 12(a) and FIG. 12(b) are diagrams showing the nitrogen adsorption isotherms related to the gas separation membrane (apatite separation membrane).
Figure 12:
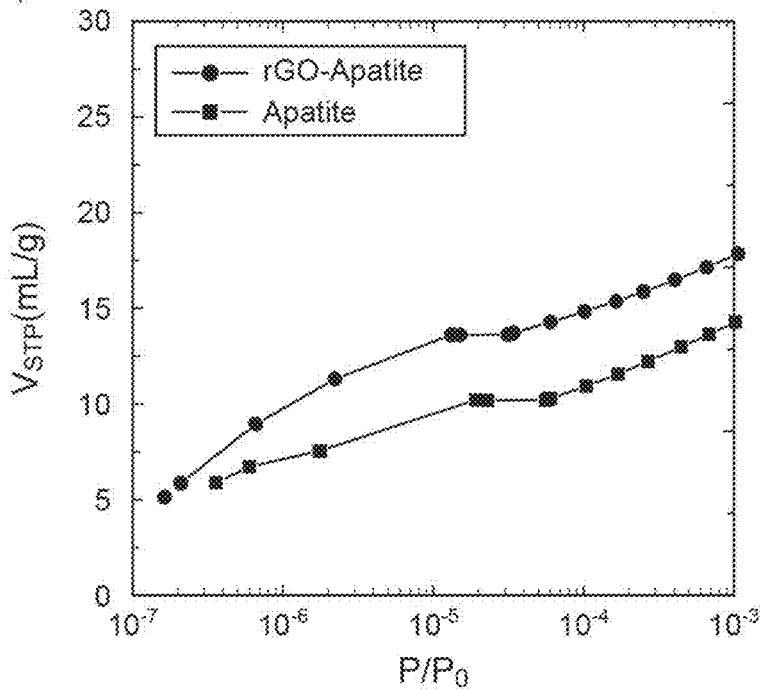

Nitrogen adsorption isotherms obtained by means of the results of the above-described measurement are shown in FIG. 12(a) and FIG. 12(b). FIG. 12(a) is a diagram showing the entirety of the nitrogen adsorption isotherms, and FIG. 12(b) is an enlarged view of the rising portion (low pressure portion). In FIG. 12, black-filled marks represent adsorption branches, and white-filled marks represent desorption branches. It was confirmed that since the apatite microcrystalline bodies according to Comparative Example 4 do not have pores within the crystals and within the particles, there is no adsorption hysteresis in the low pressure to medium pressure portion (near 0.1 to 0.7), and the amount of adsorption is not large. It was also confirmed that the amount of adsorption increases significantly from the point where the relative pressure exceeds 0.8, and the adsorption hysteresis exists. This indicates that there are gaps between particles, which act as pores. Incidentally, since the adsorption hysteresis exists on the higher pressure side compared to MFI zeolite, it is speculated that the pore size of the gaps is larger than the pore size of the gaps of MFI zeolite.

From the results of the above-described measurement, it was confirmed that the specific surface area of the powder before pressure-forming (powder of the apatite microcrystalline bodies in a state of having the periphery covered with graphene) used for the production of the apatite separation membrane according to Example 2 was 110 m$^2$/g. On the other hand, it was confirmed that the specific surface of the powder before forming (apatite microcrystalline bodies) used for the production of the separation membrane according to Comparative Example 4 was 100 m$^2$/g.

<Gas Permeability>

Figure 13:
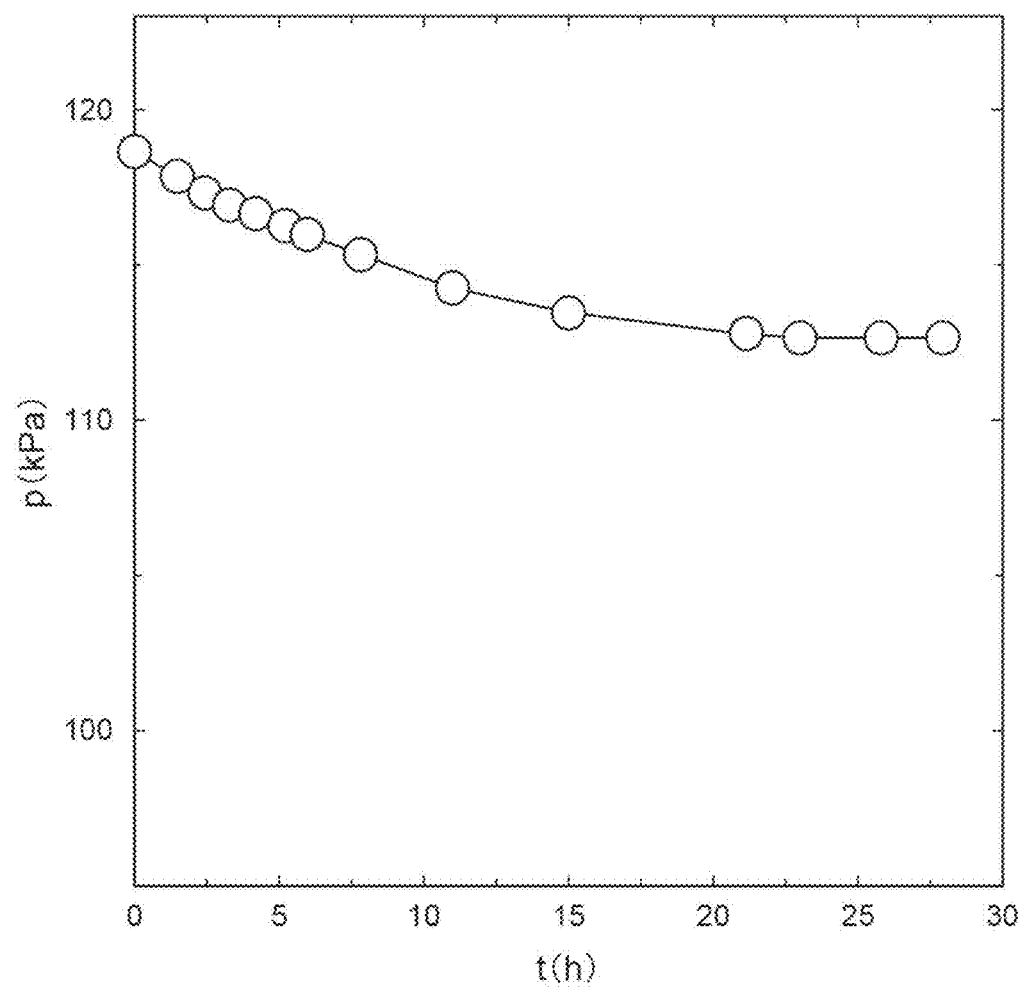
FIG. 13 is a diagram showing the results of evaluating the gas permeability related to the gas separation membrane (apatite separation membrane).

The permeability to gases was evaluated by using the apparatus 50 shown in FIG. 7. Inside the chamber 51 of the apparatus 50, the temperature was kept constant at 303 K. Into this chamber 51, a mixed gas in which the mixing volume ratio of hydrogen ($H_2$):methane ($CH_4$):sulfur hexafluoride ($SF_6$) was 1:1:1 was introduced through the inlet flow channel L1 until the pressure reached 120 kPa. At the time point where the pressure inside the chamber 51 reached 120 kPa, the valve V1 of the inlet flow channel L1 was closed. Subsequently, the valve V2 of the exhaust flow channel L2 was released. In this state, the change over time in the pressure inside the chamber 51 was measured by using the pressure gauge 52. The pressure change with respect to the time change is shown in FIG. 13. From the results shown in FIG. 13, the permeability was determined to be $1.34 \times 10^{-7}$ mol/m$^2$sPa.

<Evaluation of Selectivity>

The permeability and selectivity were evaluated for each type of gases by using the apparatus 50 shown in FIG. 7. Inside chamber 51, the temperature is kept constant at 303 K. Into this chamber 51, a target gas (gas as an object of separation) was introduced until the pressure reached 120 kPa. At the time point where the pressure inside the chamber 51 reached 120 kPa, the valve V1 of the inlet flow channel L1 was closed. Subsequently, the valve V2 of the exhaust flow channel L2 was released. In this state, the change over time in the pressure inside the chamber 51 was measured by using the pressure gauge 52. From these results, the permeability of hydrogen with respect to the target gas was determined.

Furthermore, by using the apparatus 50, a mixed gas in which the mixing volume ratio of hydrogen ($H_2$):target gas (gas as an object of separation) was 1:1 was introduced into the chamber 51 where the temperature was constant at 303 K, through the inlet flow channel L1 until the pressure reached 120 kPa. At the time point where the pressure inside the chamber 51 reached 120 kPa, the valve V1 of the inlet flow channel L1 was closed. Subsequently, the valve V2 of the exhaust flow channel L2 was released. In this state, the change over time in the pressure inside the chamber 51 was measured by using the pressure gauge 52. Furthermore, the gas discharged through the exhaust flow channel L2 was measured with a mass analyzer, and the concentration ratio of gases was determined. Incidentally, when the target gas is methane, it is considered that hydrogen passes through the gas separation membrane, and methane remains in the chamber 51.

The kinetic diameter varies depending on the target gas. The evaluation results for the selectivity and permeability for each target gas are shown in the following Table 2. From the results of Table 2, it was confirmed that when a gas having a kinetic diameter of at least 0.35 nm or greater is used as the target gas, higher performance is obtained with the apatite separation membrane according to Example 2 as compared with the separation membrane of the simple substance of apatite according to Comparative Example 4. Incidentally, the method for calculating the permeability was similar to that for the zeolite separation membrane.

TABLE 2

| Target gas | Kinetic diameter | Example 2 Permeability | Selectivity | Comparative Example 4 Permeability | Selectivity |
|---|---|---|---|---|---|
| $N_2$ | 0.36 nm | $8 \times 10^{-8}$ mol/m$^{-2}$s$^{-1}$Pa$^{-1}$ | 7 | $3 \times 10^{-5}$ mol/m$^{-2}$s$^{-1}$Pa$^{-1}$ | 3 |
| $SF_6$ | 0.55 nm | $8 \times 10^{-9}$ mol/m$^{-2}$s$^{-1}$Pa$^{-1}$ | 30 | $3 \times 10^{-5}$ mol/m$^{-2}$s$^{-1}$Pa$^{-1}$ | 3 |

REFERENCE SIGNS LIST

1: gas separation membrane, 10: zeolite microcrystalline body, 11: pore, 20: graphene, 30: support, 50: apparatus, 51: chamber, 52: pressure gauge.

The invention claimed is:

1. A method for producing a gas separation membrane, the method comprising:
    a step of leaving a dispersion liquid to stand still, the dispersion liquid being obtained by mixing zeolite microcrystalline bodies formed from MFI zeolite and graphene oxide with pure water, and covering an outer peripheral surface of each zeolite microcrystalline bodies with the graphene oxide;
    a step of drying the dispersion liquid after being left to stand to obtain a powder;
    a step of subjecting the powder to a reduction treatment of the graphene oxide by means of heating;
    a step of performing a heating treatment at a temperature higher than the heating temperature for the reduction treatment and forming nanowindows in the graphene after being reduced; and
    a step of pressure forming compression molding the powder after the reduction treatment so as to be formed into a membrane,
    wherein the dispersion liquid is left to stand still in a state of being adjusted by a pH adjusting agent to a pH in the range of 3.6 to 11.0.

2. The method for producing a gas separation membrane according to claim 1,
    wherein the pH adjusting agent is ammonium chloride, and
    the pH of the dispersion liquid is adjusted by the pH adjusting agent to the range of 3.6 to 4.0.

3. The method for producing a gas separation membrane according to claim 1, wherein the heating treatment for forming nanowindows is carried out in a temperature range of 200° C. to 600° C. for about 5 minutes to 50 hours.

4. The method for producing a gas separation membrane according to claim 1, wherein the compression molding is carried out by applying a pressure of 5 MPa to 40 MPa.

* * * * *